April 6, 1937.  G. J. LANG ET AL  2,075,904
IGNITION TIMER
Filed Aug. 21, 1934
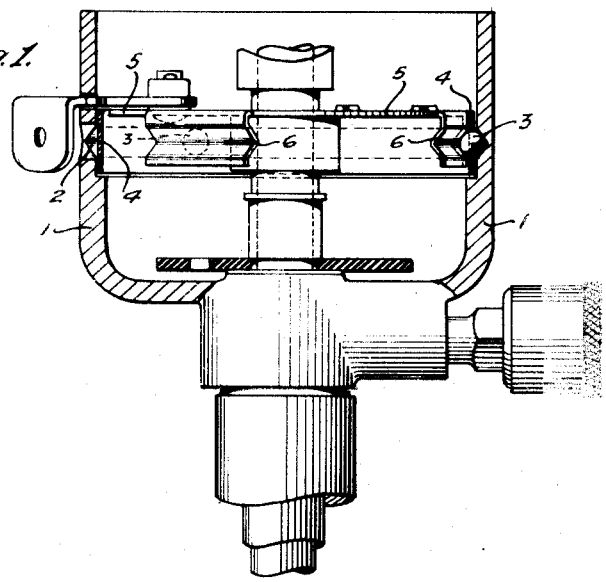
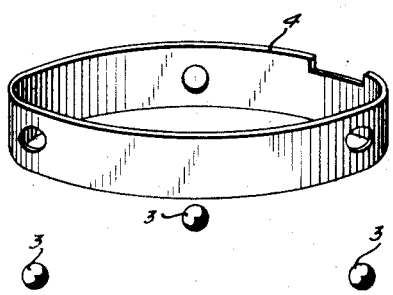
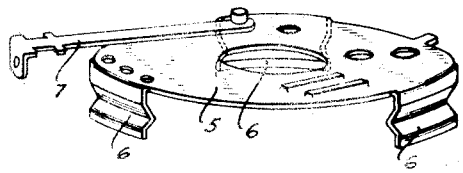
INVENTOR
Gustav J. Lang, John F. Martin
& William D. Crocker
BY
ATTORNEY Patented Apr. 6, 1937

2,075,904

UNITED STATES PATENT OFFICE 2,075,904

IGNITION TIMER

Gustave J. Lang, Longmeadow, and John F. Martin and William D. Crocker, Springfield, Mass., assignors to United American Bosch Corporation, Springfield, Mass., a corporation of New York Application August 21, 1934, Serial No. 740,756

6 Claims. (Cl. 200—19)

This invention relates to improvements in ignition timers for internal combustion engines, and more specifically to timers in which the period of ignition may be advanced or retarded by rotating the breaker plate and thus altering the angular position of the breaker lever thereon with respect to the cooperating cam on the timer shaft.

One object of this invention is to provide a timer in which the breaker plate may be more readily turned for timing.

Another object is to provide a timer in which an adjustable breaker plate has a peripheral flange cooperating with supporting means.

A further object is to provide a timer in which the breaker plate is formed to provide a bearing race.

Still a further object is to provide a timer in which the breaker plate maintains a resilient thrust to retain the bearings and avoid radial shifting when the breaker lever is operated by the cam.

Other objects and advantages will in part be stated and in part be apparent when the following specification is read in connection with the drawing in which:

Fig. 1 is a sectional view of a timer housing showing the breaker plate and the bearing mounting; Fig. 2 is an exploded view showing the breaker plate and bearing assembly.

Referring to Fig. 1 in more detail, there is shown a timer housing 1 which may be of any suitable material. In this preferred embodiment, cast iron is employed. The timer structure has not been shown in full, since this invention relates only to the breaker plate mounting. The timer housing 1 is provided with a recess 2 which forms a ball race for the bearings 3. In this preferred embodiment of the invention, there are three ball bearings although any suitable type of bearing may be employed. A retaining ring 4 maintains the bearings in the proper spaced relation. The breaker plate 5 is shown as provided with three integrally formed depending flanges 6, although a single peripheral flange may be used. The flanges are each formed with a horizontal channel which serves as a ball race. The entire assembly is firmly maintained in place radially by the resilient outward thrust of the flanges 6 together with the inherent resiliency of plate 5, and all lost motion, shifting and rattling is thus prevented in any position to which the plate is turned by the lever 7 which is operated by any suitable timing means.

It will be apparent that many changes and modifications may be made in the invention by any one skilled in the art and without departing from the true spirit and scope of the invention as expressed in the following claims.

What is claimed is:

1. In an ignition timer, a housing having a bearing surface formed therein, friction reducing bearings in contact with said surface, a breaker plate, resilient flanges carried by said plate, and a channeled bearing surface formed upon said flanges to cooperate with said bearings.

2. In an ignition timer, a housing having a bearing surface formed therein, friction reducing bearings in contact with said surface, a breaker plate, integrally formed resilient depending flanges carried by said plate, and a channeled bearing surface formed upon said flanges to cooperate with said bearings.

3. In an ignition timer, a housing having a bearing surface formed therein, friction reducing bearings in contact with said surface, a resilient breaker plate, and means for supporting said plate upon said bearings whereby the inherent resilience of said plate forms a thrust against said bearings and prevents rattling.

4. In an ignition timer, a housing having a bearing surface formed therein, friction reducing bearings in contact with said surface, a resilient breaker plate, flanges carried by said plate and cooperating with said bearings whereby the inherent resilience of said plate forms a thrust against said bearings and prevents rattling.

5. In an ignition timer, a housing having a bearing surface formed therein, friction reducing bearings in contact with said surface, a resilient breaker plate, resilient flanges carried by said plate and cooperating with said bearings, whereby the inherent resilience of said plate and flanges forms a thrust against said bearings and prevents rattling.

6. In an ignition timer, a housing, an adjustable breaker plate, a resilient peripheral flange on said breaker plate, and means cooperating with said flange to form a support for said breaker plate in said housing.

GUSTAVE J. LANG.
JOHN F. MARTIN.
WILLIAM D. CROCKER.